United States Patent
Padawer

(10) Patent No.: US 11,919,440 B1
(45) Date of Patent: Mar. 5, 2024

(54) VEHICLE DECORATION SYSTEM AND METHOD OF USE

(71) Applicant: Lindsay Padawer, Everett, WA (US)

(72) Inventor: Lindsay Padawer, Everett, WA (US)

( * ) Notice: Subject to any disclaimer, the term of this patent is extended or adjusted under 35 U.S.C. 154(b) by 0 days.

(21) Appl. No.: 17/027,134

(22) Filed: Sep. 21, 2020

(51) Int. Cl.
| | |
|---|---|
| *F21W 104/00* | (2018.01) |
| *B60Q 1/00* | (2006.01) |
| *B60Q 1/26* | (2006.01) |
| *B60R 13/00* | (2006.01) |
| *B60R 16/03* | (2006.01) |
| *F21S 43/50* | (2018.01) |
| *F21V 23/00* | (2015.01) |

(52) U.S. Cl.
CPC ......... *B60Q 1/2607* (2013.01); *B60Q 1/0088* (2013.01); *B60R 13/00* (2013.01); *B60R 16/03* (2013.01); *F21S 43/50* (2018.01); *F21V 23/003* (2013.01); *F21W 2104/00* (2018.01)

(58) Field of Classification Search
CPC .... B60Q 1/0088; B60Q 1/2607; B60R 13/00; B60R 16/03; F21S 43/50; F21V 23/003; F21W 2104/00
See application file for complete search history.

(56) References Cited

U.S. PATENT DOCUMENTS

| | | | | | |
|---|---|---|---|---|---|
| 2,753,441 | A | * | 7/1956 | Kuykendall | B60R 13/00 428/10 |
| 5,016,145 | A | * | 5/1991 | Singleton | B60Q 1/50 362/605 |
| 5,315,492 | A | * | 5/1994 | Davenport | A47G 33/00 362/397 |
| 5,803,577 | A | * | 9/1998 | Stratton | F21V 21/0808 362/398 |
| 5,979,094 | A | * | 11/1999 | Brafford, Jr. | B60D 1/60 40/590 |
| 6,079,136 | A | * | 6/2000 | Kozlarek | G09F 13/04 280/507 |
| 6,357,899 | B1 | * | 3/2002 | Craven | B60Q 1/44 362/498 |
| 6,398,388 | B1 | * | 6/2002 | Lorenzana | F21S 4/20 362/240 |
| 6,491,315 | B2 | * | 12/2002 | Hagen | B60Q 1/2661 280/169 |
| 6,540,370 | B1 | * | 4/2003 | Picklo | B60R 13/00 362/540 |
| 6,553,697 | B1 | * | 4/2003 | Pichan | G09F 13/04 40/575 |
| 6,655,822 | B1 | * | 12/2003 | Sylvester | B60Q 1/2661 362/806 |
| 6,883,945 | B1 | * | 4/2005 | Gonzalez | B60Q 1/30 362/545 |
| 9,434,225 | B1 | * | 9/2016 | Corsaut | B60D 1/58 |

(Continued)

*Primary Examiner* — Zheng Song
(74) *Attorney, Agent, or Firm* — Richard Eldredge; Leavitt and Eldredge Law Firm

(57) ABSTRACT

A vehicle decoration system includes a decorative wreath, the decorative wreath attached to a connector, the connector configured to secure to a vehicle; one or more lights secured to the decorative wreath; a control system associated with the decorative wreath and configured to operate the one or more lights; an electrical connector connecting the control system to a vehicle plug and the control system in communication with a vehicle control system via the vehicle plug; the one or more lights are activate via commands associated with the vehicle.

5 Claims, 4 Drawing Sheets

(56) References Cited

U.S. PATENT DOCUMENTS

| | | | | |
|---|---|---|---|---|
| 2004/0130890 A1* | 7/2004 | Lopez | ............... | B60Q 1/50 362/183 |
| 2006/0209549 A1* | 9/2006 | Valdez | ............... | B60Q 1/50 362/485 |
| 2012/0090206 A1* | 4/2012 | Prescott | ............... | G09F 13/22 40/541 |
| 2012/0256543 A1* | 10/2012 | Marcove | ............... | B60Q 1/2696 362/540 |
| 2012/0320620 A1* | 12/2012 | Bosarge | ............... | G09F 13/04 362/546 |
| 2015/0102731 A1* | 4/2015 | Altamura | ............... | A47G 33/0836 315/152 |
| 2016/0167568 A1* | 6/2016 | Salami, Jr. | ............... | B60Q 1/0088 362/543 |
| 2016/0212829 A1* | 7/2016 | Orazem | ............... | B60Q 1/18 |
| 2020/0327832 A1* | 10/2020 | Mitchell, Jr. | ............... | G09F 13/22 |

\* cited by examiner

VEHICLE DECORATION SYSTEM AND METHOD OF USE

BACKGROUND

1. Field of the Invention

The present invention relates generally to vehicle decoration systems, and more specifically, to a vehicle decoration system that utilizes a decorative wreath in connection with the vehicle control system, such that the one or more lights on the wreath light up as activated by the vehicle control system.

2. Description of Related Art

Vehicle decoration systems are well known in the art and are effective means to add holiday flare to a vehicle. For example, FIG. 1 depicts a flowchart 101 of a conventional method, wherein the user has a vehicle and adds stickers, items, or other decorations to the vehicle, as shown with boxes 103, 105. The user can then drive around with the decorations displayed, as shown with box 107.

One of the problems commonly associated with method 101 is limited use. For example, the user may desire more interaction with the decorations, thereby making them more appealing.

Accordingly, although great strides have been made in the area of vehicle decoration systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
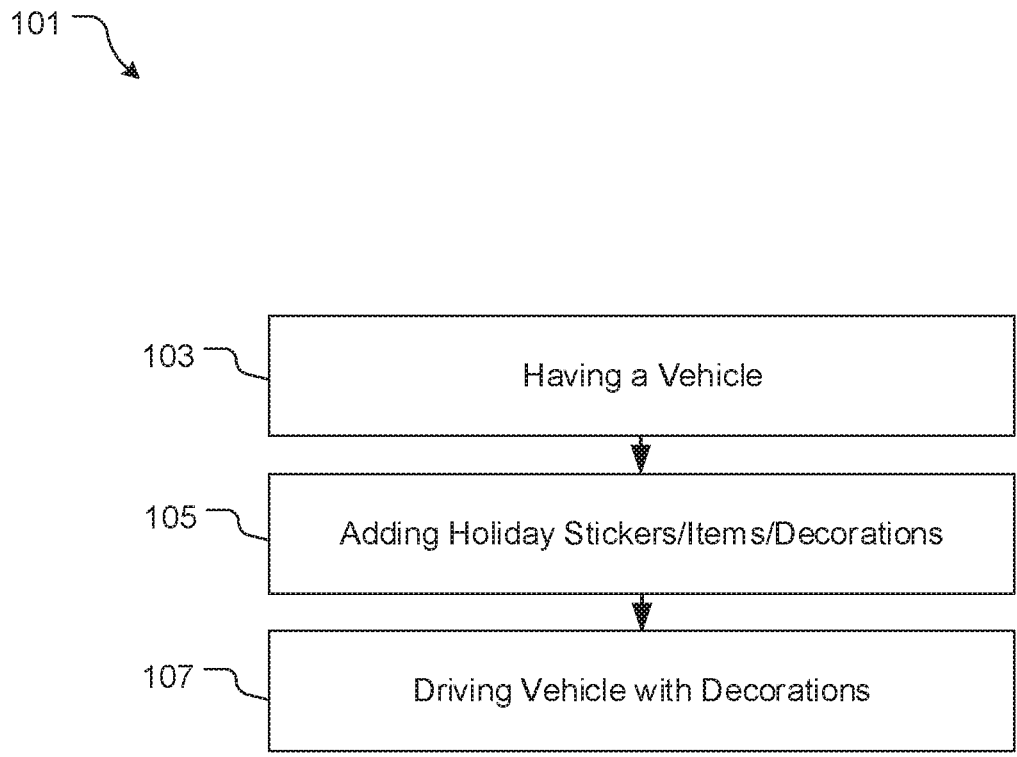
FIG. 1 is a flowchart of a conventional method of decorating a vehicle.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The system and method of use in accordance with the present application overcomes one or more of the above-discussed problems commonly associated with conventional vehicle decoration systems. Specifically, the present invention provides for a vehicle decoration system with a wreath that connects to a vehicle control system, thereby allowing for user control of the wreath via the vehicle control system. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
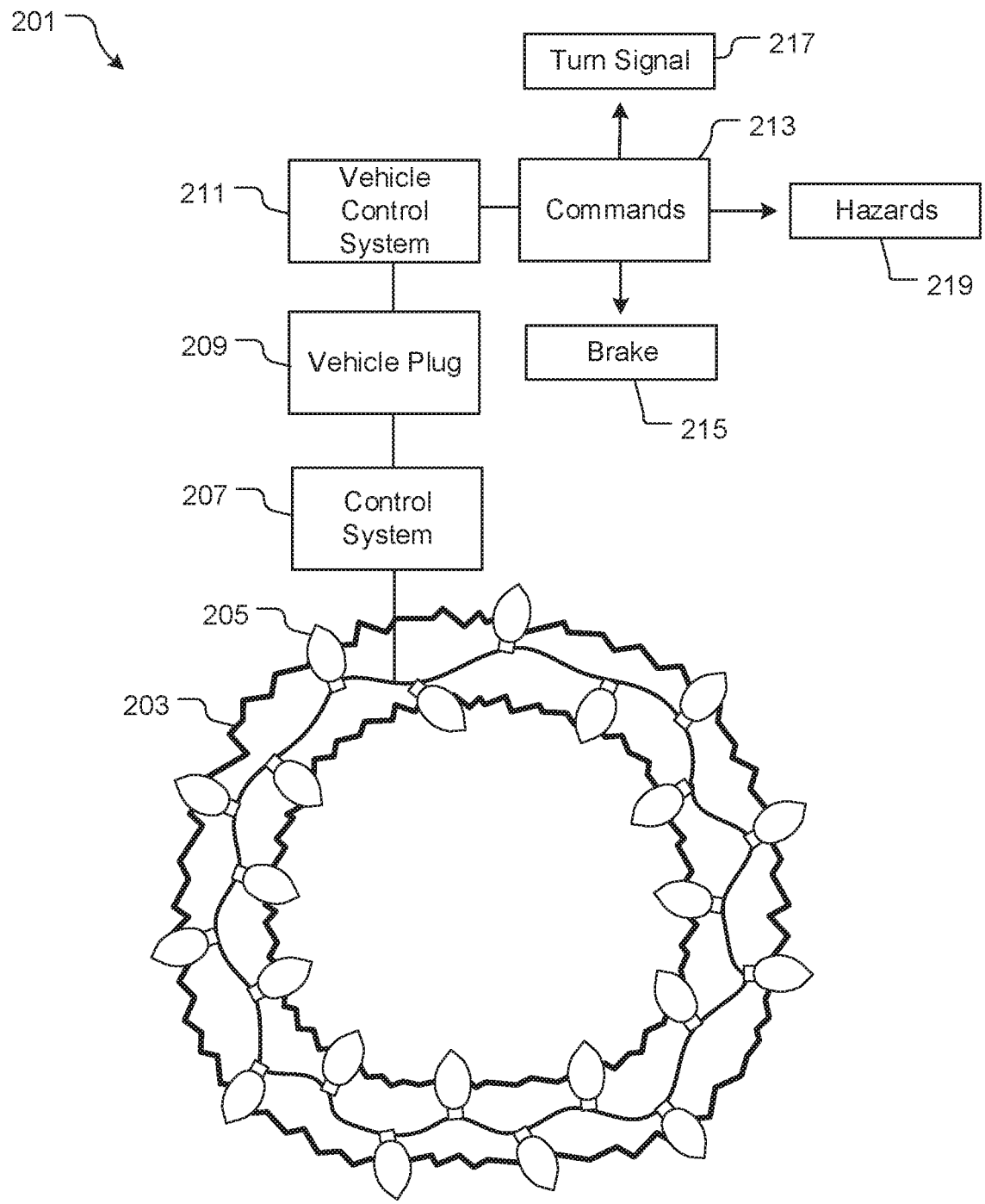
FIG. 2 is a schematic of a vehicle decoration system in accordance with a preferred embodiment of the present application.

Referring now to the drawings wherein like reference characters identify corresponding or similar elements throughout the several views, FIG. 2 depicts a schematic of a vehicle decoration system 201 in accordance with a preferred embodiment of the present application. It will be appreciated that system 201 overcomes one or more of the above-listed problems commonly associated with conventional vehicle decoration systems.

In the contemplated embodiment, system 201 includes a decorative wreath 203 which may vary in aesthetics and include one or more lights 205. It should be appreciated that the lights may be in various colors, shapes, sizes, and/or arrangements. Further, it should be appreciated that the wreath can vary in size, shape, materials, and the like. The one or more lights 205 are connected to a control system 207 that is configured to connect to a vehicle plug 209 such as via an electrical connection 301 (See FIG. 3). It should be appreciated that those skilled in the art can adapt the connection to fit various vehicle plugs, such as a 4 or 6 pin. Alternatively, it should be appreciated that the control system 207 may be connected directly to the vehicle control system 211 such as via wire connections.

The control system 207 will receive commands 213 based on user actions. For example, the control system 207 may receive a brake command 215, a turn signal command 217, or a hazards command 219.

It should be appreciated that one of the unique features believed characteristic of the present application is the adaptation of the control system 207 to receive various commands and implement the commands to provide various aesthetics. For example, it is contemplated that activation of the brake command 215 may light up all of the one or more lights 205, activation of the hazards command 219 may light up only a predetermined color, such as yellow or red, and the turn signal command 217 may only light up one side of the one or more lights to correspond with the turn signal light. It should be appreciated that the same technology can be adapted for use with various other aesthetical designs, such as strips of garland that may be added to a truck bed, as well as light strands that may be added to a vehicle such as onto a roof rack.

Figure 3:
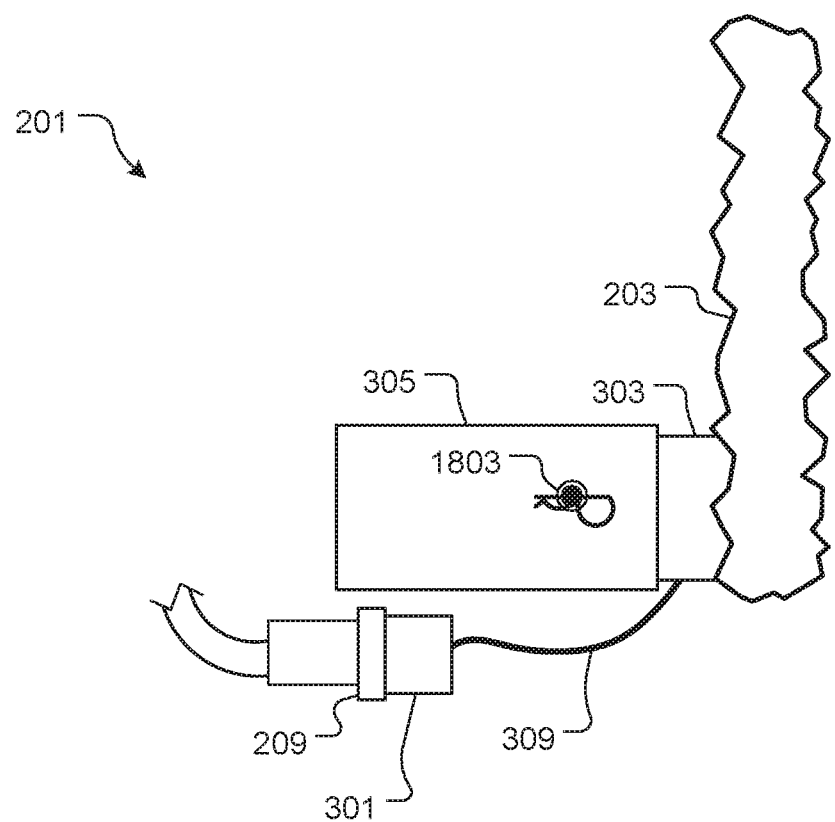
FIG. 3 is a side view of one exemplary embodiment of a connection system in accordance with the present application.

In FIG. 3, a side view depicts one exemplary embodiment of a connection associated with system 201. It should be appreciated that the decorative wreath 203 may include a connector 303 that can vary. As shown, it is contemplated that one connector is a hitch connector that attaches to a hitch receiver 305 via a pin 307. Again, it should be appreciated that those skilled in the art can vary the connector as suitable for various needs.

As shown, one or more wires 309 may be used to connect to the decorative wreath to the vehicle plug 209 to activate connection to the vehicle control system.

Figure 4:
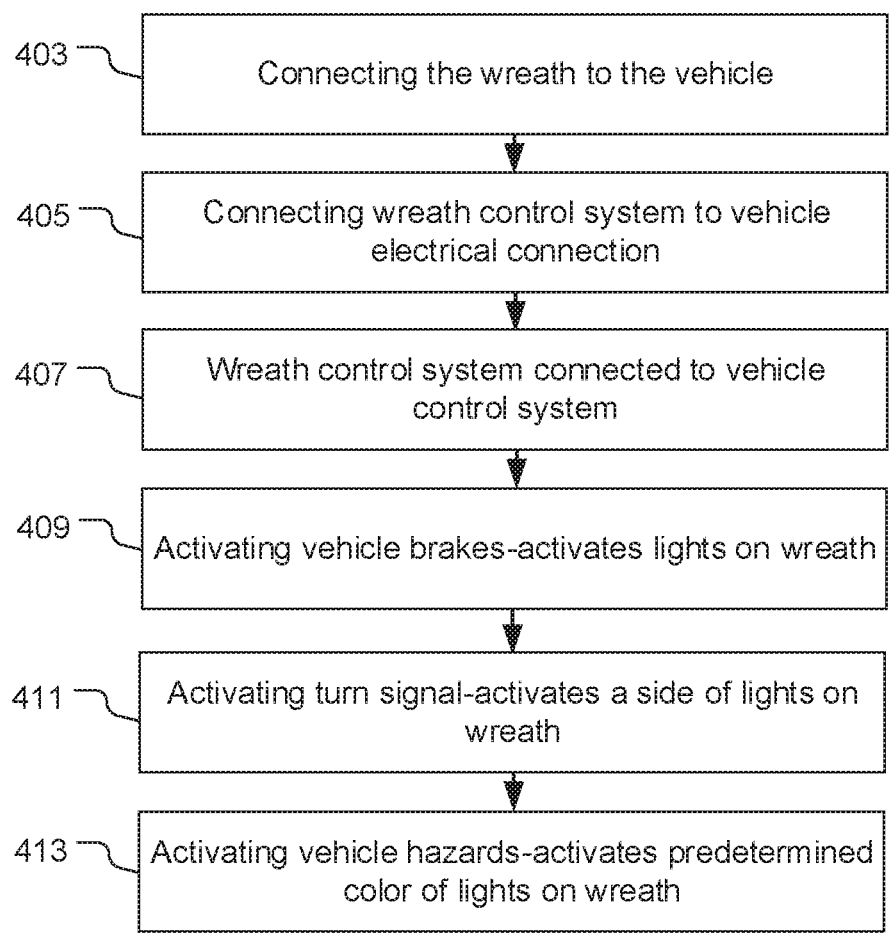
FIG. 4 is a flowchart of a method of use of the system of FIG. 2.

In FIG. 4, a flowchart 401 depicts a method of use of system 201. During use, the user will connect the wreath to the vehicle via a connector, as shown with box 403. The user will then connect the wreath control system to the vehicle electrical system, via one of various means, as shown with boxes 405, 407. The user will then be able to activate various functions via the vehicle control system, as shown with boxes 409, 411, 413.

The particular embodiments disclosed above are illustrative only, as the embodiments may be modified and practiced in different but equivalent manners apparent to those skilled in the art having the benefit of the teachings herein.

It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A vehicle decoration system for a vehicle having a hitch receiver and a plug, the system comprising:
   a decorative wreath;
   a connector attached to the wreath, the connector is configured to removably attach to the hitch receiver, the connector having a same geometry as the hitch receiver;
   one or more lights secured to the decorative wreath;
   a control system associated with the decorative wreath and configured to operate the one or more lights;
   an electrical connector connecting the control system to the vehicle plug that is positioned near the hitch receiver; and
   the control system in communication with a vehicle control system via the vehicle plug;
   wherein the one or more lights are activated via commands associated with the vehicle such that the one or more lights are turned on and off remotely via the control system.

2. The system of claim 1, wherein the commands comprise:
   a brake command;
   a turn signal command; and
   a hazards command.

3. The system of claim 2, wherein the brake command activates all of the one or more lights.

4. The system of claim 2, wherein the turn signal command activates solely a first side of the one or more lights to indicate turning of the vehicle.

5. The system of claim 2, wherein the hazards command activates a predetermined color of the one or more lights.

\* \* \* \* \*